March 17, 1953 — W. H. STRICKLAND — 2,631,765
FISHING ROD CARRIER FOR VEHICLES
Filed Nov. 12, 1948 — 2 SHEETS—SHEET 1
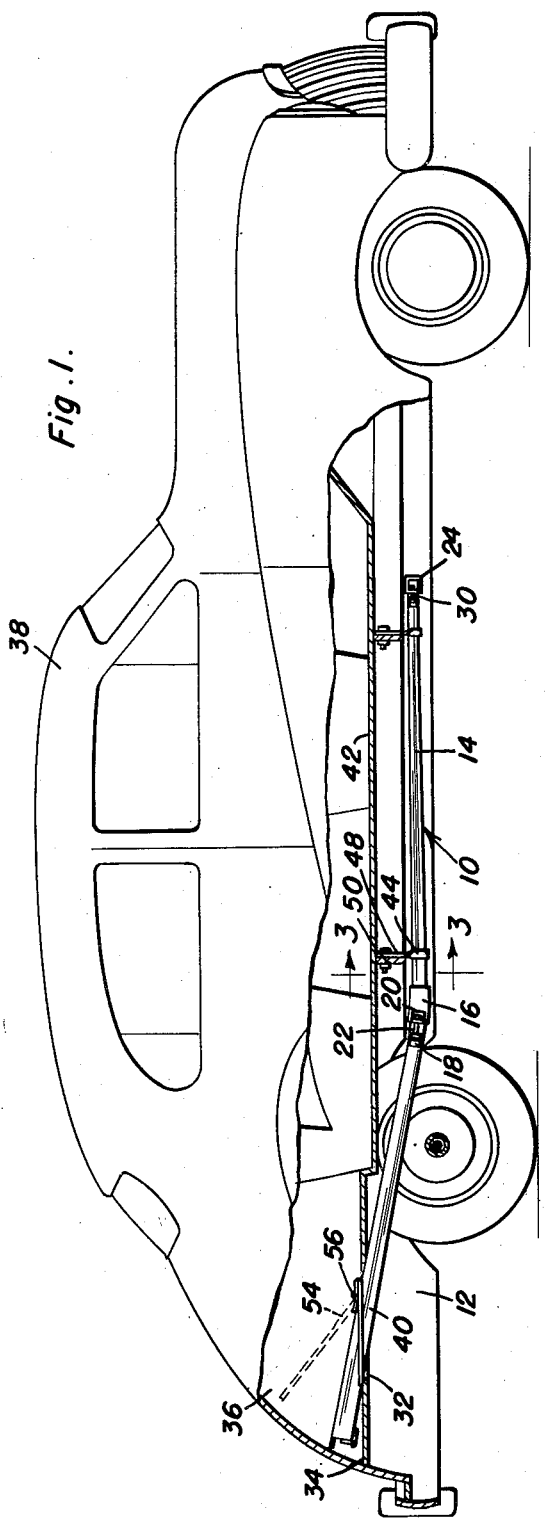
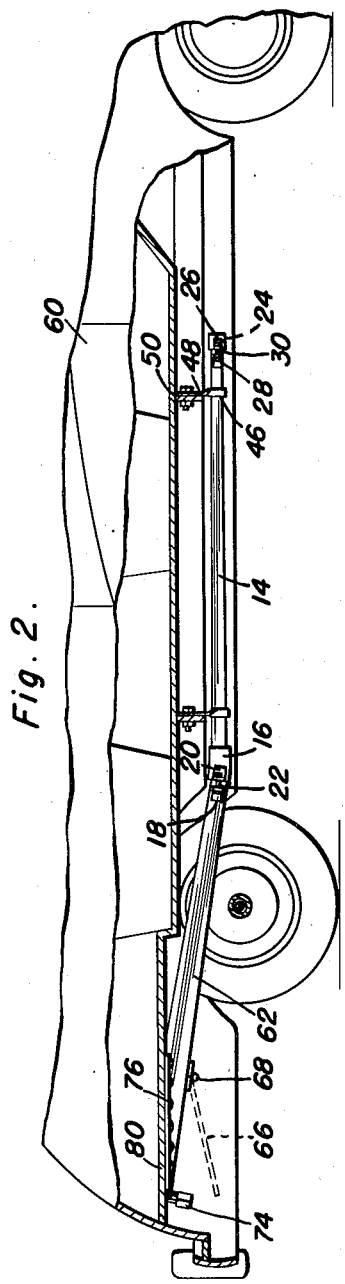
William H. Strickland
INVENTOR.

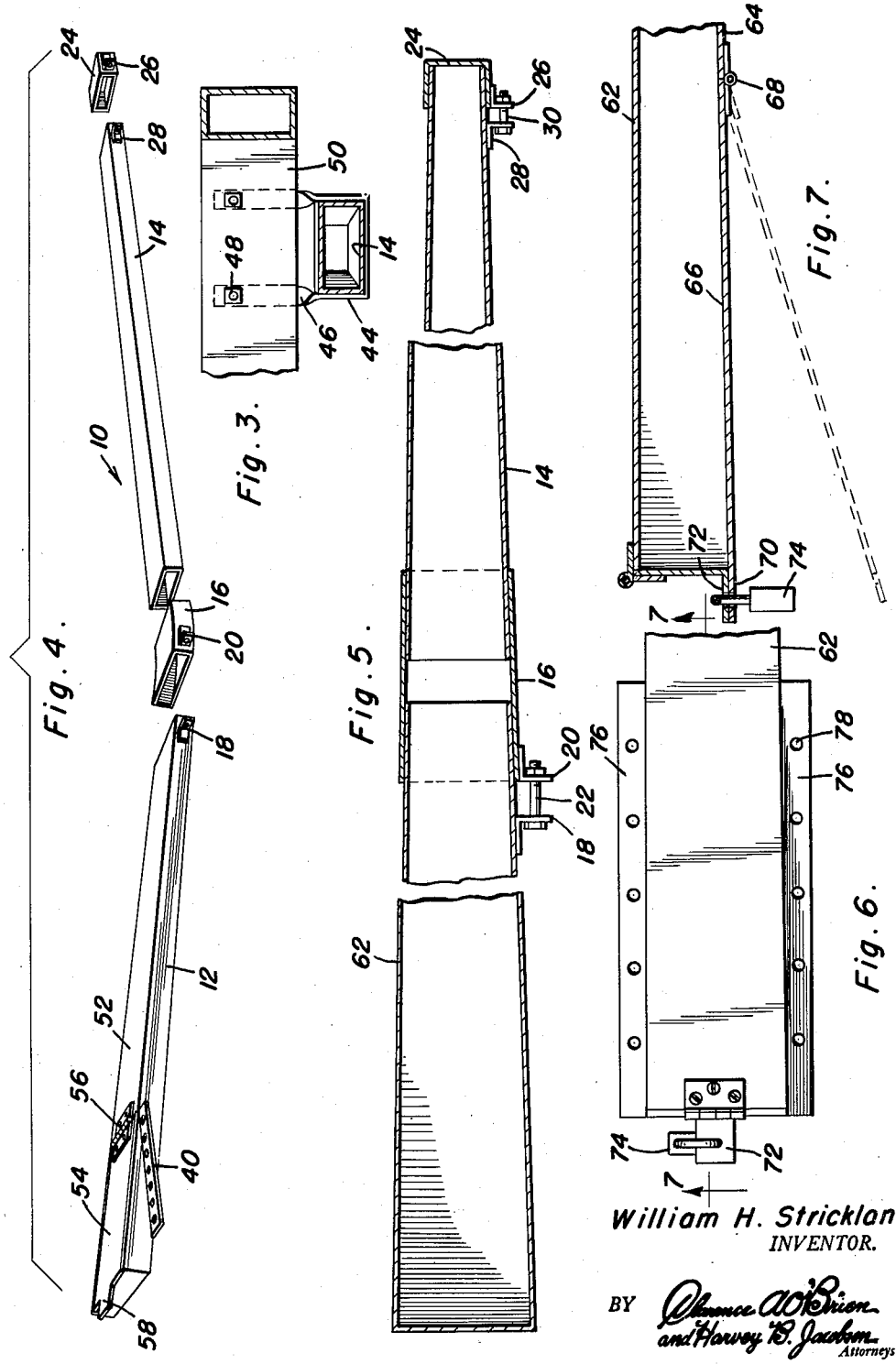

Patented Mar. 17, 1953

2,631,765

UNITED STATES PATENT OFFICE 2,631,765

FISHING ROD CARRIER FOR VEHICLES

William H. Strickland, Julian, Calif.

Application November 12, 1948, Serial No. 59,564

2 Claims. (Cl. 224—42.41)

This invention relates to new and useful improvements in article carriers for vehicles and the primary object of the present invention is to provide an attachment for vehicles suspended beneath the vehicle body and so constructed as to receive and retain fishing poles and the like in a safe and conveniently accessible position.

Another important object of the present invention is to provide a fishing pole carrier for vehicles that is quickly and readily applied to or removed from a vehicle body in a convenient manner and which includes a rear end that can be supported beneath the rear of a vehicle or extended into a vehicle trunk or luggage compartment.

A further object of the present invention is to provide a carrier for vehicles including an elongated hollow body having closures at each end which are conveniently manipulated to an open position so that inspectors, custom officials and the like may view the interior of the body by a flashlight.

A still further aim of the present invention is to provide a fishing rod carrier for vehicles that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of one type of vehicle, with parts broken away, and showing the present invention applied thereto;

Figure 2 is a fragmentary side elevational view of another type of vehicle, with parts broken away, and showing the present invention in slightly modified form applied thereto;

Figure 3 is an enlarged transverse vertical sectional view taken substantially on the plane of section line 3—3 of Figure 1;

Figure 4 is a group perspective view of one embodiment of the present invention, as illustrated in Figure 1;

Figure 5 is a fragmentary longitudinal horizontal sectional view of Figure 4 and showing the parts assembled;

Figure 6 is a fragmentary bottom plan view of the embodiment of the present invention illustrated in Figure 2; and, Figure 7 is a fragmentary longitudinal vertical sectional view taken substantially on the plane of section line 7—7 of Figure 6.

Referring now to the drawings in detail, wherein for the purpose of illustration, and more particularly to Figures 1, 3 and 4, wherein there is disclosed one embodiment of the present invention, the numeral 10 represents an elongated hollow body or container generally, including a rear section 12, a forward section 14 and an intermediate section 16.

All of the sections 12, 14 and 16 are tapered toward their forward ends, and the intermediate section is arcuately shaped to receive the reduced forward end of the rear section 12 and the enlarged rear end of the forward section 14.

Complemental angle members 18 and 20 are fixed to the rear section 12 and intermediate section 16 and are adjustably connected by a suitable fastener such as a bolt and nut 22.

The flanged portion of a forward closure 24 embraces the reduced, forward open end of the forward section 14 and is provided with an angle member 26 that cooperates with a further angle member 28 fixed to the forward end of the section 14. A suitable fastener such as a bolt and nut 30 adjustably connects the angle members 26 and 28.

The rear end of the rear section 12 extends upwardly through an opening 32 provided in the bottom wall 34 of the trunk compartment or luggage compartment 36 of a vehicle 38 and the sides of the rear section 12 are provided with anchoring strips 40 that are secured to the bottom wall 34.

The anchoring strips are disposed in a substantially horizontal plane and the rear section 12 is inclined upwardly and rearwardly whereas the forward section 14 is substantially horizontal.

In order to support the present invention relative to the floor board 42 of the vehicle 38, there is provided a plurality of U-shaped hangers 44 having twisted leg portions 46 that are removably secured by bolts and nuts or the like 48 to cross members or braces 50 forming a part of the vehicle. These hangers 44 embrace the forward section 14 and suitably secured to the same to prevent longitudinal movement of the forward section.

The upper wall 52 of the rear section 12 is provided with an opening that is normally closed by a closure 54 which is hinged as at 56 to the upper wall 52 for upward opening movement, and the closure 54 is provided with a suitable hand grip 58.

It should be noted, that the form of the present invention illustrated in Figures 1, 3 and 4 is intended for use with a vehicle having a luggage compartment or trunk, therefore, there is not provided a locking mechanism for the closure 54 since the trunk lock (not shown) will protect the present invention from unauthorized persons.

Reference is now directed to Figures 2, 5, 6 and 7 wherein there is disclosed the present invention in use with a vehicle 60 having no trunk or luggage compartment.

In this latest embodiment, all parts are similar to the embodiment previously described with the exception of the end section that is designated by the numeral 62.

The rear section 62 is provided with an opening in its lower wall 64 that is normally closed by a closure 66 which is hinged as at 68 to the bottom wall 64.

An ear 70 fixed to the closure 66 registers with an ear 72 fixed to the section 62 and a suitable lock 74 engages the ears 70 and 72 to retain the closure in a locked position.

Flanges 76 having a plurality of apertures 78 project outwardly from the sides of the rear section 62 and receive suitable fasteners for anchoring the section 62 in a vertically inclined position to the bottom wall 80 of the vehicle at the rear thereof.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination with a vehicle having a floor board and a trunk compartment, a fishing rod carrier comprising an elongated hollow container having forward and rear end portions, means supporting the container beneath the floor board and longitudinally of the vehicle, and means securing the rear portion of the container to the bottom wall of the trunk compartment, the bottom wall of said trunk compartment being provided with an opening receiving the rear end portion of said container, the rear portion of said container being housed in said trunk compartment.

2. In a vehicle having a plurality of transversely extending braces beneath its floor board and also having a trunk compartment and a door for the trunk compartment, a fishing rod carrier comprising an elongated container including an upwardly inclined rear portion, hanger straps carried by and depending from said braces and supporting said container beneath the floor board, said floor board having an opening entering the trunk compartment, the rear portion of said container being received in said compartment, said rear portion having an entrance opening accessible through the interior of said trunk compartment, and an attaching flange on the rear portion secured to the floor board.

WILLIAM H. STRICKLAND.

REFERENCES CITED

The following references are of record in the file of this patent:

UNITED STATES PATENTS

| Number | Name | Date |
|---|---|---|
| 290,205 | Bronson | Dec. 18, 1883 |
| 676,486 | Beaver | June 18, 1901 |
| 1,049,951 | Waite | Jan. 7, 1913 |
| 1,158,394 | Skelton | Oct. 26, 1915 |
| 1,252,775 | Butcher | Jan. 8, 1918 |
| 1,419,166 | Nelson | June 13, 1922 |
| 1,629,403 | Marwahn | May 17, 1927 |
| 2,143,720 | Smith | Jan. 10, 1939 |
| 2,169,453 | Schenbeck | Aug. 15, 1939 |
| 2,354,943 | Clark | Aug. 1, 1944 |